United States Patent [19]
Phillips

[11] 3,770,298
[45] Nov. 6, 1973

[54] TRAILER HITCH ANTI-BREAKAWAY DEVICE

[76] Inventor: Floyd W. Phillips, 26274 McDonald St., Dearborn Heights, Mich. 48125

[22] Filed: June 23, 1971

[21] Appl. No.: 155,875

[52] U.S. Cl................................. 280/457, 280/507
[51] Int. Cl............................................. B60d 1/12
[58] Field of Search................... 280/507, 511, 457

[56] References Cited
UNITED STATES PATENTS
2,438,749  3/1948  Harrer ............................ 280/511
2,834,611  5/1958  Chenette......................... 280/511

FOREIGN PATENTS OR APPLICATIONS
919,725  2/1963  Great Britain..................... 280/507

Primary Examiner—Robert R. Song
Attorney—Learman & McCulloch

[57] ABSTRACT

An anti-breakaway device for preventing the inadvertent vertical separation of a ball and socket type trailer hitch, having a downwardly opening ball receiving socket, and a draft ball attached to a draft vehicle and received in the socket, the device including interconnected locking plates which overlie portions of the hitch and underlie portions of the draft ball to restrict relative vertical movement of the ball and the socket.

5 Claims, 4 Drawing Figures

PATENTED NOV 6 1973　　　　　　　　　　　3,770,298

INVENTOR
FLOYD W. PHILLIPS

BY Learman & McCulloch
ATTORNEYS

TRAILER HITCH ANTI-BREAKAWAY DEVICE

FIELD OF THE INVENTION

This invention relates to trailer hitches of the ball and socket type and more particularly, to a device for preventing inadvertent separation of the ball and socket that would otherwise result from a sudden jarring.

BACKGROUND OF THE INVENTION

Hitch assemblies, for coupling an automobile, tractor, or light truck to a trailer, have been provided in the past with downwardly opening sockets which receive the draft ball fixed to the tow bar of a draft vehicle. Some of these hitch assemblies include a slidable lock bar or plunger which is normally spring biased to a position such that a portion of the plunger passes under a portion of the ball to restrict the opening of the socket and thus prevent the separation of the socket and ball under normal towing circumstances.

If a vehicle towing a trailer, with the use of a conventional hitch assembly, negotiates a sharp depression or obstruction in the highway, or is otherwise subjected to a sharp or sudden jarring action, the trailer tongue and vehicle drawbar will be subjected to relative vertical bouncing movement which can force the ball past the lock bar against the biasing force of the spring and permit the ball to slip out of the socket. This, of course, results in a hazardous condition.

SUMMARY OF THE INVENTION

Apparatus constructed according to the present invention includes an anti-breakaway device to be used with a trailer hitch having an open bottom, ball receiving socket and a flange extending laterally about the socket, and a ball attached to a towing vehicle and received in the socket, the device comprising means for preventing the inadvertent vertical separation of the ball and the socket including plate means for underlying portions of the ball and a marginal track connected to the plate means for receiving the flange and having a portion overlying the flange to restrict relative movement of the ball and the socket.

The present invention may more readily be described by reference to the accompanying drawings, in which.

Figure 1:
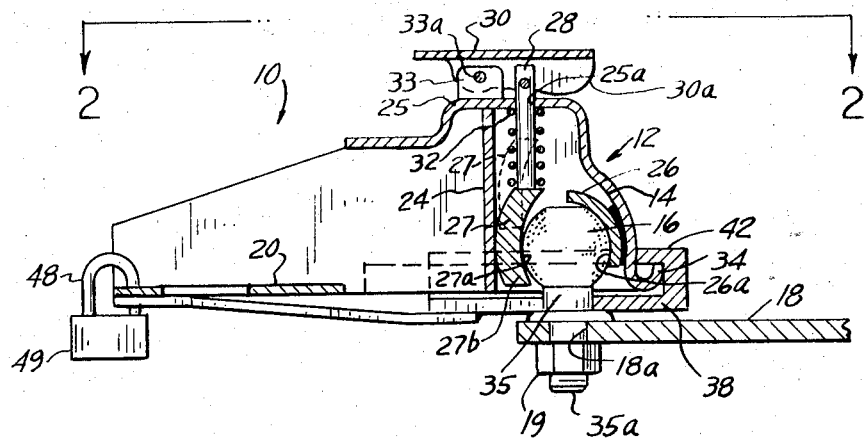
FIG. 1 is a sectional side view of a trailer hitch and towbar assembly incorporating apparatus constructed according to the invention, and taken along the line 1 — 1 of FIG. 2.
Figure 2:
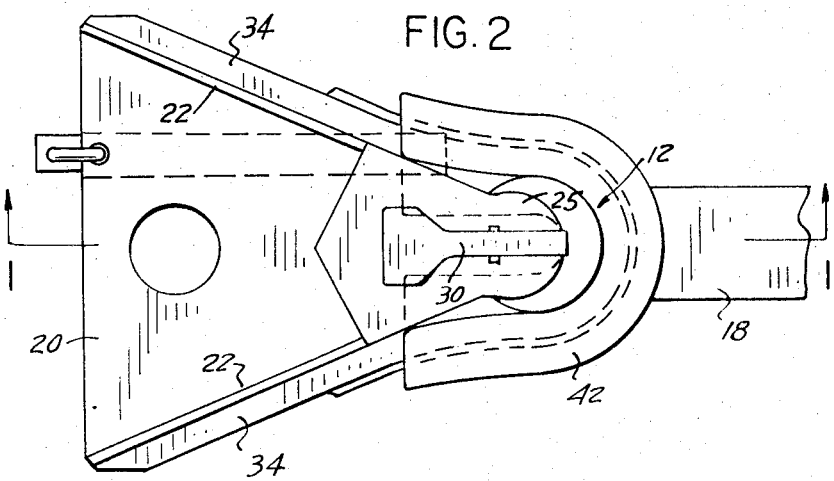
FIG. 2 is a top plan view of the apparatus illustrated in FIG. 1.

Apparatus constructed according to the present invention is particularly adapted to use with a trailer hitch, generally designated 10, including a bottom plate member 20 fixed to a trailer tow bar (not shown) and upstanding forwardly converging side plates 22 terminating at their forward ends, in an open bottom head portion, generally designated 12. Provided in the head portion 12 is a downwardly opening socket, generally designated 14, for receiving a ball 16 fixed to a draw bar 18 of a draft vehicle (not shown). A vertical wall 24 spans the side walls 22 and is fixed at its upper end to the upper, flatted wall portion 25 of the head portion 12. The socket 14 includes a partly spherical member 26 fixed to the head 12 in any suitable manner such as by welding, and has a downwardly opening mouth 26a for receiving the ball 16. The side walls 22 and head portion 12 are provided, along the lower marginal portions thereof with a lateral upturned flange 34 for a purpose to be described more particularly hereinafter.

A plunger 27 is provided for selectively restricting movement of the draft ball 16 and includes a partly spherical pocket 27a which is complemental to the spherical contour of the surface of the ball 16. The lower margin 27b of the plunger 27 is adapted to extend around the under surface of the ball 16 so as to restrict the downwardly opening mouth 26a. A stem 28 is fixed to the plunger 27 and passes through an opening 25a in the upper wall 25 of the head 12. The upper end of the stem 28 is pivotally connected to a locking lever or handle 30 which functions with a camming action to withdraw the plunger 27 from the solid line position, shown in FIG. 1, to the chain line position, shown in FIG. 1, to enlarge the mouth 26 and permit the ball 16 to slip out of the socket 14.

The lever 30 has rounded heel portions 30a which are in bearing engagement with the upper surface of the wall 25 and which permit the lever 30 to smoothly move from the solid line position, shown in FIG. 1, to the chain line position, shown in FIG. 1. A compression spring 32 surrounds the stem 28 and is usually confined under substantial pressure to urge the plunger 27 to the solid line position, illustrated in FIG. 1. It should be pointed out that there is sufficient play between the plunger 27, wall 24, and ball 16 to permit the lower marginal portion 27b of the plunger to slide past the ball 16 and move between the solid line position, illustrated in FIG. 1, and the chain line position, also illustrated in FIG. 1, when the handle 30 is swung to the chain line position shown in FIG. 1.

Fixed to the upper wall 25 is an upstanding plate 33 having an aperture therein aligned with an aperture in the handle 30 for receiving a pin 33a to releasably lock the handle 30 thereto. With the handle 30 locked in the solid line position, illustrated in FIG. 1, the plunger 27 will restrict relative vertical movement of the ball and hitch under normal towing circumstances. If, however, the trailer or vehicle, or both, should be subjected to a sudden jarring action, forces which are transmitted to the hitch 10 and ball 16 will tend to vertically separate the ball and hitch so that the ball 16 and the plunger 27 move past each other against the force of the compression spring 32 and the ball 16 will slip out of the socket 14.

Figure 3:
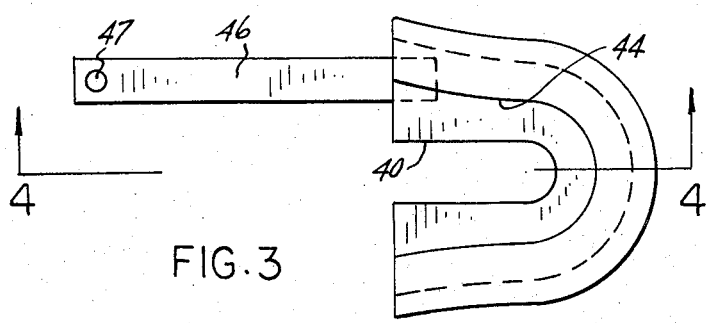
FIG. 3 is a top plan view illustrating only the anti-breakaway device constructed according to the present invention.
Figure 4:
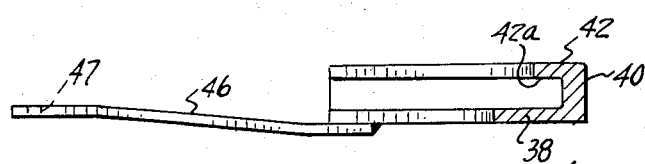
FIG. 4 is a sectional side view of the anti-breakaway device, taken along the line 4 — 4 of FIG. 3.

To prevent this inadvertent vertical separation, apparatus constructed according to the present invention is provided and is particularly illustrated in FIGS. 3 and 4. This apparatus includes a lower plate 38 having an elongated slot 40 therein of a width sufficient to receive the stem 35 on which the ball 16 is mounted. Fixed to the plate 18 is side wall 40 and an upper plate 42 which cooperate to define a track 42a for receiving the flange 34 of the hitch 10. The plate 42 includes a rearwardly opening notch or slot 44 which receives the head portion 12 of the trailer hitch. The plate 42 overlies the flange 34 so that the flange 34 is prevented from moving upwardly. The plate 38 underlies a portion of the ball 16 so that the ball 16 is prevented from moving downwardly. To prevent the anti-breakaway device from moving longitudinally and to prevent theft of the trailer, a locking apparatus is provided comprising an elongated bar 46 welded to the plate 38 and including an aperture 47 therein for receiving the hasp 48 of a lock 49 which passes through a complementally formed aperture in the hitch plate 20.

THE OPERATION

The handle or locking lever 30 is swung upwardly to the chain line position (FIG. 1) and the ball 16 is moved into the socket 14. The handle 30 is then returned to the solid line position (FIG. 1) so that the plunger 27 is returned to the solid line position (FIG. 1) to restrict downward movement of the ball under normal towing circumstances. After the ball 16 is placed in the socket 14 as illustrated in FIG. 1, the anti-breakaway device constructed according to the present invention is slipped endwisely over the hitch 10 so that the track 42a receives the flange 34 and the slot 40 receives the stem 35. If the trailer is subjected in a vertical jarring, the plates 38 and 42 engage the lower side of the ball 16 and upper side of the flange 34 to prevent separation of the ball and socket.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. An anti-breakaway device for preventing the inadvertent separation of a trailer hitch, having an open bottom, ball receiving socket and a flange extending laterally of said socket and a ball attached to an upstanding, reduced diameter stem portion on the tow bar of a draft vehicle and received in said socket, said device comprising:
   plate means including an elongated, rearwardly opening notch, for receiving said stem portion, said notch being of a width less than the diameter of said ball to permit said plate means to move between a removed position and an operative position in which a portion of said plate means underlies a portion of said ball;
   a marginal track, connected to said plate means, having a portion over-lying said flange, when said plate means is in said operative position, to restrict, with said plate means, relative ver-tical movement of said ball and said socket; and
   means for selectively preventing forward movement of said plate means from said operative position to said removed position.

2. The anti-breakaway device of claim 1 wherein said overlying portion comprises an upper plate vertically spaced above said plate means and including a rearwardly opening notch of a width substantially greater than said first mentioned notch for receiving portions of said trailer hitch.

3. The anti-breakaway device of claim 1 wherein said means for preventing forward movement of said plate means includes a bar fixed to said anti-breakaway device and means for releasably locking said bar to said trailer hitch.

4. An anti-breakaway device for preventing the inadvertent separation of a trailer hitch, having an open bottom, ball receiving socket and a flange extending laterally of said socket, and a ball attached to the tow bar of a draft vehicle and received in said socket, said device comprising:
   a plate, including a rearwardly opening, openended slot to permit said plate to be rearwardly moved between a removed position and an operative position in which a portion of said plate adjoining said slot will underlie a portion of said ball;
   lock means connected to said plate and having a portion for overlying said flange, when said plate is in said operative position, to restrict, with said plate, relative vertical movement of said ball and said socket; and
   means for removably securing said plate in said operative position.

5. An anti-breakaway device for preventing the inadvertent separation of a trailer hitch, having an open bottom, ball receiving socket and a laterally extending flange adjacent said socket, and an upstanding ball attached to the tow bar of a draft vehicle and received in said socket, said device comprising:
   marginal lock means, generally U-shaped in plan, having a portion movable between a remote position and a locking position overlying said flange;
   means connected to said lock means having a laterally inwardly extending portion vertically spaced from said marginal lock means, underlying a portion of said ball when said lock means is in said operative position for restricting, with said lock means relative vertical movement of said ball and said socket; and
   means for preventing forward movement of said marginal lock means from a position underlying said ball.

* * * * *